Nov. 2, 1948.                C. R. BUCHET                2,452,726
                MULTIROTOR HELICOPTER WITH TILTABLE ROTORS
Filed July 16, 1945                              2 Sheets-Sheet 1
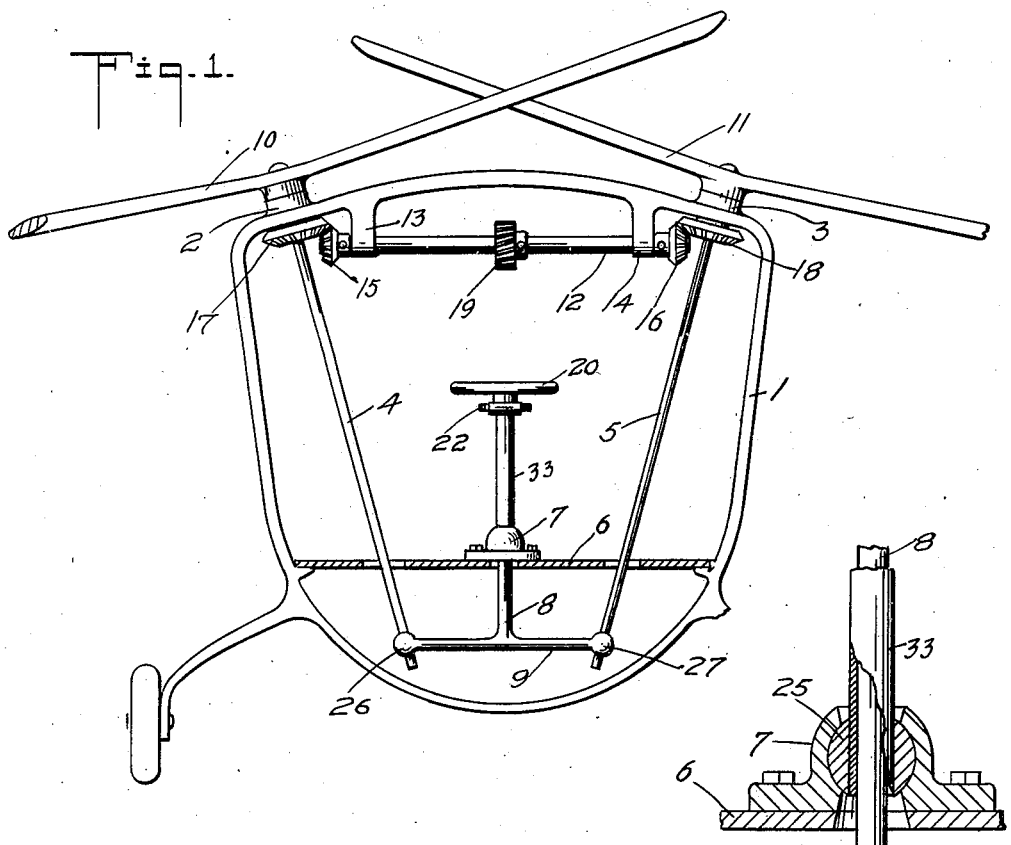
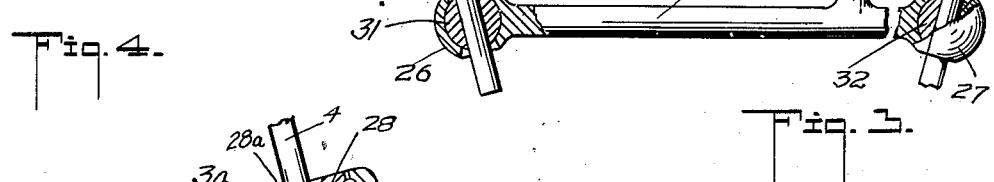
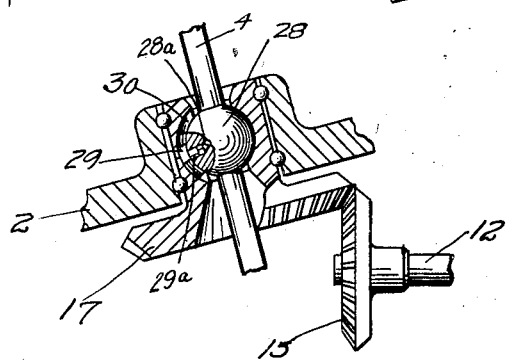
INVENTOR:
C. R. BUCHET
BY
ATTORNEY Nov. 2, 1948.                    C. R. BUCHET                    2,452,726
                MULTIROTOR HELICOPTER WITH TILTABLE ROTORS
Filed July 16, 1945                                      2 Sheets-Sheet 2
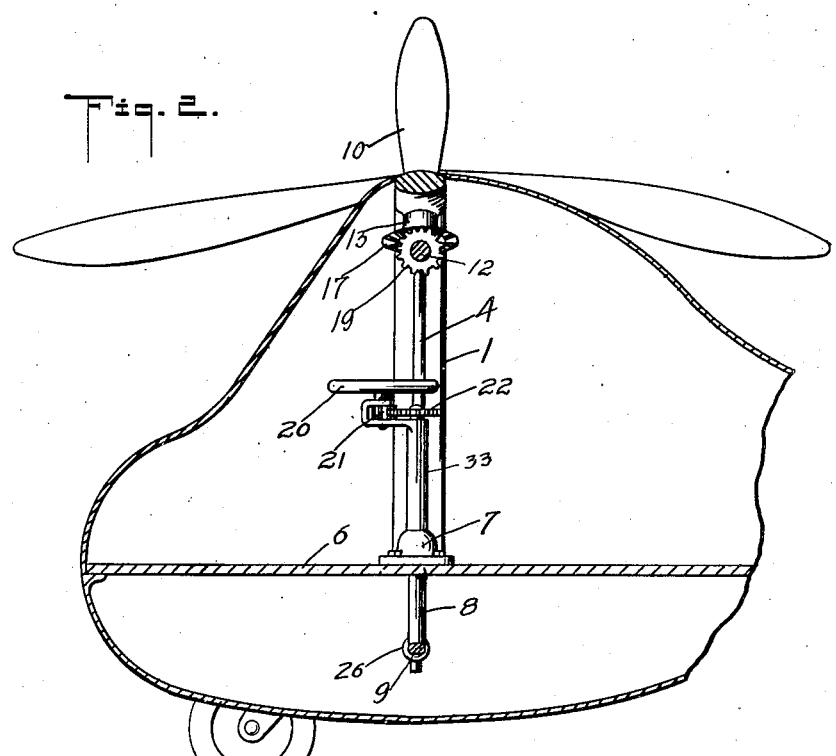
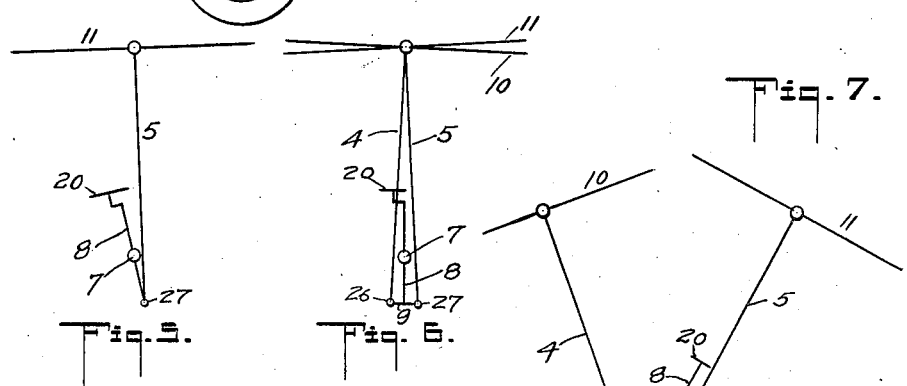
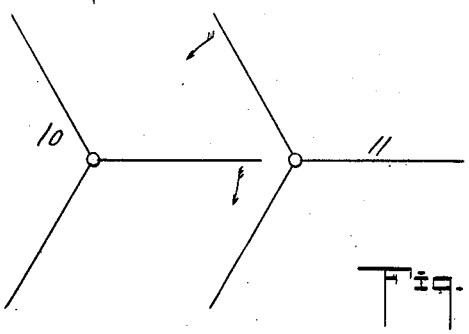
INVENTOR:
C. R. BUCHET
BY
O. Martin
ATTORNEY.

Patented Nov. 2, 1948

2,452,726

UNITED STATES PATENT OFFICE 2,452,726

MULTIROTOR HELICOPTER WITH TILTABLE ROTORS

Conrad R. Buchet, Pasadena, Calif., assignor of one-half to Milton H. Lees, Jr., Pasadena, Calif.

Application July 16, 1945, Serial No. 605,230

10 Claims. (Cl. 244—17)

The present invention relates to aircraft of the helicopter type and has particular reference to improvements in the rotor control of dual rotors for such craft.

It is the object of my invention to provide simple and convenient control devices for such dual-rotor craft. It is a further object to provide a control device by means of which the two rotors may be relatively adjusted not merely to produce the three basic aircraft motions, the pitch, the turn and the roll, but any desired combination of these motions. A still further object is to provide a single control member which, by simple manipulation, is capable of effecting all such rotor adjustments. Another object is to arrange the two rotors of the aircraft in reverse-dihedral relation to each other to the end that a device may be constructed that is substantially as compact as the single rotor helicopter and which is substantially self-balancing.

Other objects and the many advantages of the present invention will be apparent from the following detailed description and reference to the accompanying drawings, of which:

Fig. 1 is a cross sectional front view of a rotor control mechanism embodying the invention;

Fig. 2 is a side view taken substantially through the vertical center of Fig. 1;

Figs. 3 and 4 are fragmentary, sectional views, on a larger scale, of parts of the foregoing views;

Fig. 5 shows, diagrammatically, a certain readjustment of the central portion of Fig. 2;

Fig. 6 illustrates, diagrammatically, a readjustment of the mechanism as it appears in Fig. 1;

Fig. 7 illustrates a different position of adjustment thereof; and

Fig. 8 is a diagrammatic plan view showing the relation the two rotors of the device hold to each other.

The structure of the invention, in the form illustrated in the drawings, is mounted within a fuselage which may be of any conventional shape and construction best suited to the purposes of my invention, and only a small portion of the fuselage is shown in the drawings.

A frame 1 is transversely mounted within the fuselage, and it may well define the contour thereof. At the upper corners of this frame are bearings 2, 3, which support two downwardly directed, converging shafts 4, 5.

On the flooring 6, of the fuselage, is mounted a bearing 7 for a vertical shaft 8, to the lower end of which is rigidly secured a cross arm 9. The shafts 4, 5 are journaled in the ends of this arm. It is important to note that all of these parts, as indicated in Fig. 2, are placed in the same vertical plane.

It is also noted, as indicated in Fig. 1, that the control shaft 8 is centrally positioned between the rotor shafts. The axis of the control shaft is considered the vertical axis of the craft, and a transverse perpendicular line through the joint 7, the horizontal axis.

The two shafts are at the top fitted rigidly to support rotors 10, 11, which also may be of any type ordinarily used in helicopters. The shafts are interconnected for rotation in opposite directions in the manner which will now be described in detail.

A transverse shaft 12 is journaled in bearings 13, 14, of the frame 1 and it is fitted at the ends with bevel gears 15, 16 which, in turn, are in permanent mesh with bevel gears 17, 18. The latter are seated to rotate in the bearings 2, 3 and they are axially perforated to receive the shafts 4, 5 in a manner which will be described presently. The shaft 12 is in any suitable manner connected for rotation by a prime mover, but as such connections form no part of the present invention, it is thought sufficient, for illustration, to show a gear wheel 19 secured to the shaft, as forming part of such connections. The rotors are, as above stated, driven in opposite directions from this shaft to cause the machine to rise vertically.

It will be noticed by anyone familiar with this art, that the structure so far described differs radically from the conventional dual-rotor type of helicopter, in which the rotors are dihedrally directed and, in order to clear the fuselage of the aircraft, set far out to the sides thereof on greatly extended frames. By reversing the shaft inclinations, it is seen that the rotors can be brought so close together that space is barely left between the shafts for the operating mechanism and the operator of the machine. This, of course, is a great advantage, making possible the design of a machine transversely and vertically substantially as compact as the conventional single rotor helicopter. In addition, it has the great advantage that the maximum lifting power is concentrated directly above the center of the fuselage where it is most effective and should be positioned in order to maintain perfect balance of the machine. In other words, in the present invention is combined the compactness of the single rotor with the stability, balance and lifting power of the separate dual-rotor craft.

The control of the helicopter equipped with the devices of my invention is limited to directional adjustment of the rotor shafts 4, 5 and is extremely simple, as will appear from the following detailed description thereof. As shown in Fig. 3, the bearing 7 is internally shaped to receive a spherical enlargement 25 of the control shaft 8. A universal joint is in this manner provided, by means of which the control shaft may be rotated, within the limits of the bearing, in any position of inclination. Similar universal joints are provided at the points 26, 27, where the shafts 4, 5 are joined to the ends of the arm 9. For structural reasons, the shaft 8 turns within a tubular post 33, and the latter is rigidly secured to the enlargement 25.

The bearings within the bevel gears 17, 18 may also be similarly constructed. But, because these gears are depended upon to rotate the rotor shafts, it becomes necessary to embody in these bearings interengaging driving elements. Illustrative of such devices, I have in Fig. 4 shown the shaft 4 fitted with a spherical enlargement 28 from the periphery of which a stud or spline 29 projects, and the latter is seated to slide in a circular groove 30 of the bearing. This spline is made with a shank 29a which is seated for rotation in a radially directed recess 28a of the spherical enlargement. When so equipped, the angular position of the shaft may be modified as desired without affecting the rotating movement thereof.

The maneuvering of the aircraft should be clear to anyone competent to design a machine embodying the present invention and is for this reason herein only briefly explained. Coordination of the three basic motions of all aircraft is, in the present invention, obtained by simple manipulation of the control shaft 8. Motion about the lateral axis, that is the pitch, is controlled by tilting the shaft 8 forward, as indicated in Fig. 5, or rearward. Rotation about the vertical axis in one direction or the other is obtained by a simple rotation of this shaft to incline one rotor forwardly and the other rearwardly, substantially as indicated in Fig. 6.

A hand wheel 20 is provided for convenient rotation of the shaft, and it may furthermore be found advantageous for better coordination to connect this wheel to the shaft through the gears 21, 22. It is a peculiarity of the present device that rotation of the control shaft in one direction results in tilting movement of the rotors to turn the craft in the opposite direction. But the introduction of this gear connection eliminated this disadvantage. When, in addition, the gear 21 is smaller than the gear 22, less manual effort is required to manipulate the controls and closer adjustment is obtainable.

Turning about the longitudinal axis is effected by tilting the control shaft right or left, substantially as indicated in Fig. 7. But as the ends of the arm 9 are caused to swing vertically in response to such tilting movement of the control shaft, it becomes necessary to mount the rotor shaft for axial movement within the spherical members 31, 32 of the bearings 26, 27.

While, in the manner just described, the three basic motions may be effected by the aforenamed simple adjustments of the control shaft, it is seen that, by simple combinations of tilting and rotating movements thereof, any desired directional change may be as readily obtained.

Where the rotors are so compactly installed it is, of course, necessary so to arrange the relative positions of the blades that no danger of collision is possible. In case of simple, two blade rotors, the blades of the two rotors may be set perpendicular to each other. Where three blade rotors are employed, the blades may be arranged as indicated in Fig. 8, and no difficulty will be encountered.

It is seen from the foregoing description that I have provided an extremely compact device, the maneuvering of which is effected by manual adjustment of a single control element. While I have illustrated and described a structure embodying these features, this disclosure is not to be considered as limiting the invention to the exact constructions and arrangements thereof, but I reserve the right to embody therein changes and modifications within the scope of the claims hereto appended to the end that a commercially practical and acceptable device may be produced.

I claim:

1. In a helicopter having a fuselage, two downwardly converging angularly adjustable shafts arranged in a transverse vertical plane within said fuselage in one angular position thereof, rotors on the upper ends of said shafts above the fuselage, means for rotating said shafts in opposite directions, and a control element manually operable simultaneously to move the two shafts thereby to vary the angular relation of one shaft to the other.

2. In a helicopter having a fuselage, two downwardly converging angularly adjustable shafts arranged within the fuselage in a transverse vertical plane in one angular position thereof and fitted at the upper ends with spherical enlargements, bearings in the fuselage, tubular members seated for rotation in said bearings, and internally shaped to receive said shaft enlargements, means for rotating said members in opposite directions, and means interlocking the members and the said enlargements for simultaneous rotation, said means leaving the enlargements free to turn in any direction to vary the angular relation of one shaft relative to the other.

3. In a helicopter having a fuselage and bearings at the top thereof, two downwardly converging rotor shafts seated in said bearings for angular adjustment therein, means for rotating said shafts in opposite directions, a control member vertically mounted in the fuselage for angular adjustment therein, and means operatively interconnecting the lower end of said member with the lower ends of the said shafts.

4. In a helicopter having a fuselage and bearings at the top thereof, two downwardly converging rotor shafts seated in said bearings for angular adjustment therein, means for rotating said shafts in opposite directions, a bearing in the fuselage, a vertically directed control member extending through said bearing and seated therein for angular adjustment, and means operatively interconnecting the lower end of said member with the lower ends of said shafts.

5. In a helicopter having a fuselage and bearings at the top thereof, two downwardly converging rotor shafts seated in said bearings for angular adjustment therein, means for rotating said shafts in opposite directions, a bearing in the fuselage, a vertically directed control member extending through said bearing and terminating at the bottom in a horizontal extension, said member having a spherical element seated in said bearing for rotation in all directions, and means operatively interconnecting the ends of said extension with the lower ends of said shafts.

6. In a helicopter having a fuselage and bearings at the top thereof, two downwardly converging rotor shafts extending through said bearings and seated for angular adjustment therein, means for rotating said shafts in opposite directions, a bearing in the fuselage centrally positioned below said top bearings, a control member vertically extending through said central bearing and seated for angular adjustment therein, said member terminating at the bottom in a cross bar having bearings at its ends through which said shafts extend, the two shafts and the said central control member being all placed in the same vertical plane in one angular position of adjustment thereof.

7. In a helicopter having a fuselage and bearings at the top thereof, two downwardly converging rotor shafts seated in said bearings for angular adjustment therein, means for rotating said shafts in opposite directions, a control member vertically mounted in the fuselage for angular adjustment therein, means operatively interconnecting the lower end of said control member with the lower ends of said shafts, a hand wheel, and gear connections between said wheel and the said control member.

8. In a helicopter having a fuselage, bearings at the top thereof, two downwardly converging angularly adjustable shafts having spherical enlargements seated for rotation in said bearings, means for rotating said shafts in opposite directions, a bearing centrally placed within the fuselage below said top bearings, and a vertically directed control member having a spherical enlargement seated for rotations within said central bearing, said member having a horizontal bar at the bottom terminating at the ends in bearings, the said shafts having spherical enlargements seated for rotation in the bearings of said bar, the shafts being normally co-planar with the member and relatively angularly adjustable in response to axial rotation thereof.

9. In a helicopter having a fuselage and bearings at the top thereof, two downwardly converging rotor shafts having spherical enlargements seated for rotation in said bearings, means for rotating said shafts in opposite directions, a bearing centrally placed below said top bearings, a tubular post having a spherical enlargement seated for rotation in all directions within said central bearing, a control member seated for rotation in said post and having bearings at its bottom, and spherical elements on said shafts seated in the last named bearings for rotation in all directions.

10. In a helicopter having a fuselage and bearings at the top thereof, two downwardly converging rotor shafts having spherical enlargements seated for rotation in said bearings, means for rotating said shafts in opposite directions, a bearing centrally placed below said top bearings, a tubular post having a spherical enlargement seated for rotation in all directions within said central bearing, a control member seated for rotation in said post and having bearings at the bottom, spherical elements on said shafts seated in the last named bearings for rotation in all directions, a relatively large gear wheel on the upper end of said control member, a hand wheel on the post, and a relatively small gear wheel on said hand wheel in mesh with the larger gear wheel.

CONRAD R. BUCHET.

REFERENCES CITED

The following references are of record in the file of this patent:

FOREIGN PATENTS

| Number | Country | Date |
|---|---|---|
| 826,798 | France | Jan. 12, 1938 |

OTHER REFERENCES

Ser. No. 254,867, Flettner (A. P. C.), pub. May 25, 1943.